No. 844,518. PATENTED FEB. 19, 1907.
H. HARDEN.
CUTTING IMPLEMENT.
APPLICATION FILED FEB. 24, 1906.
2 SHEETS—SHEET 2.
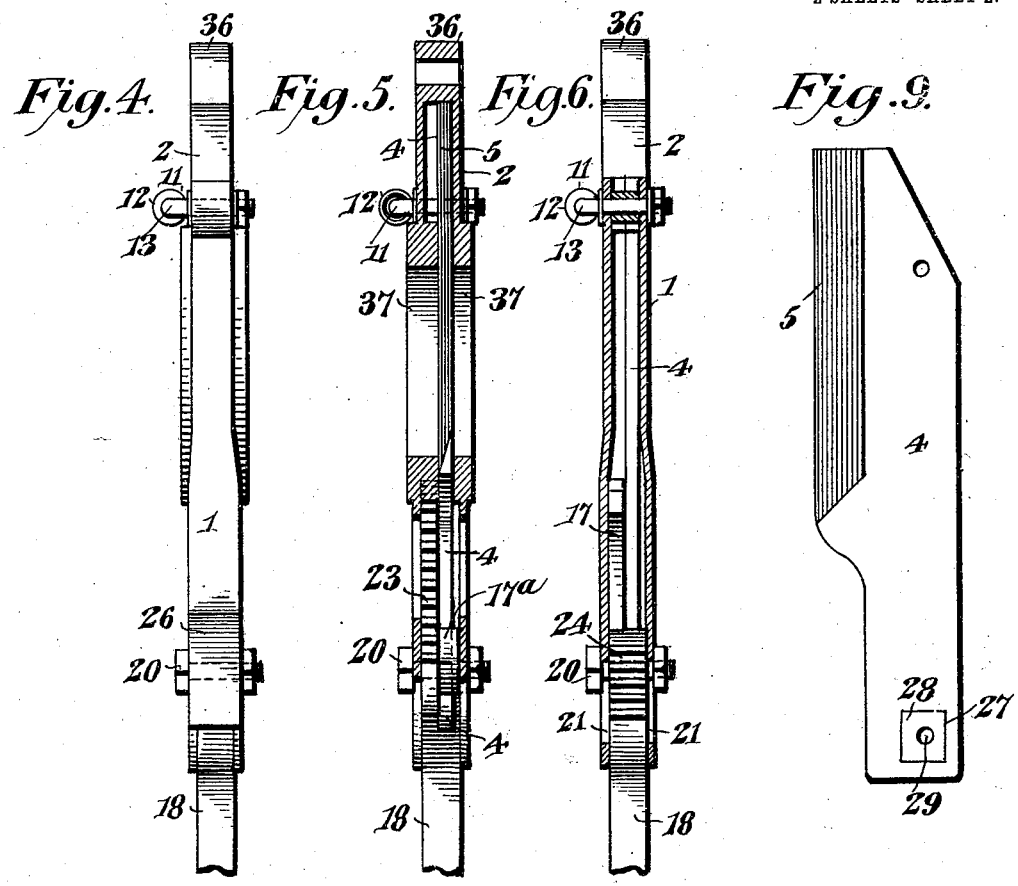
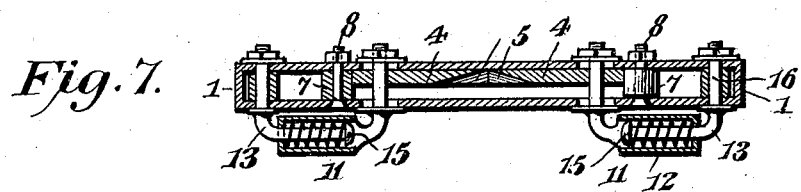
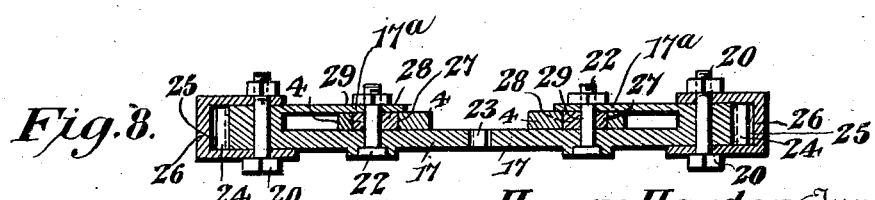
Harry Harden, Inventor

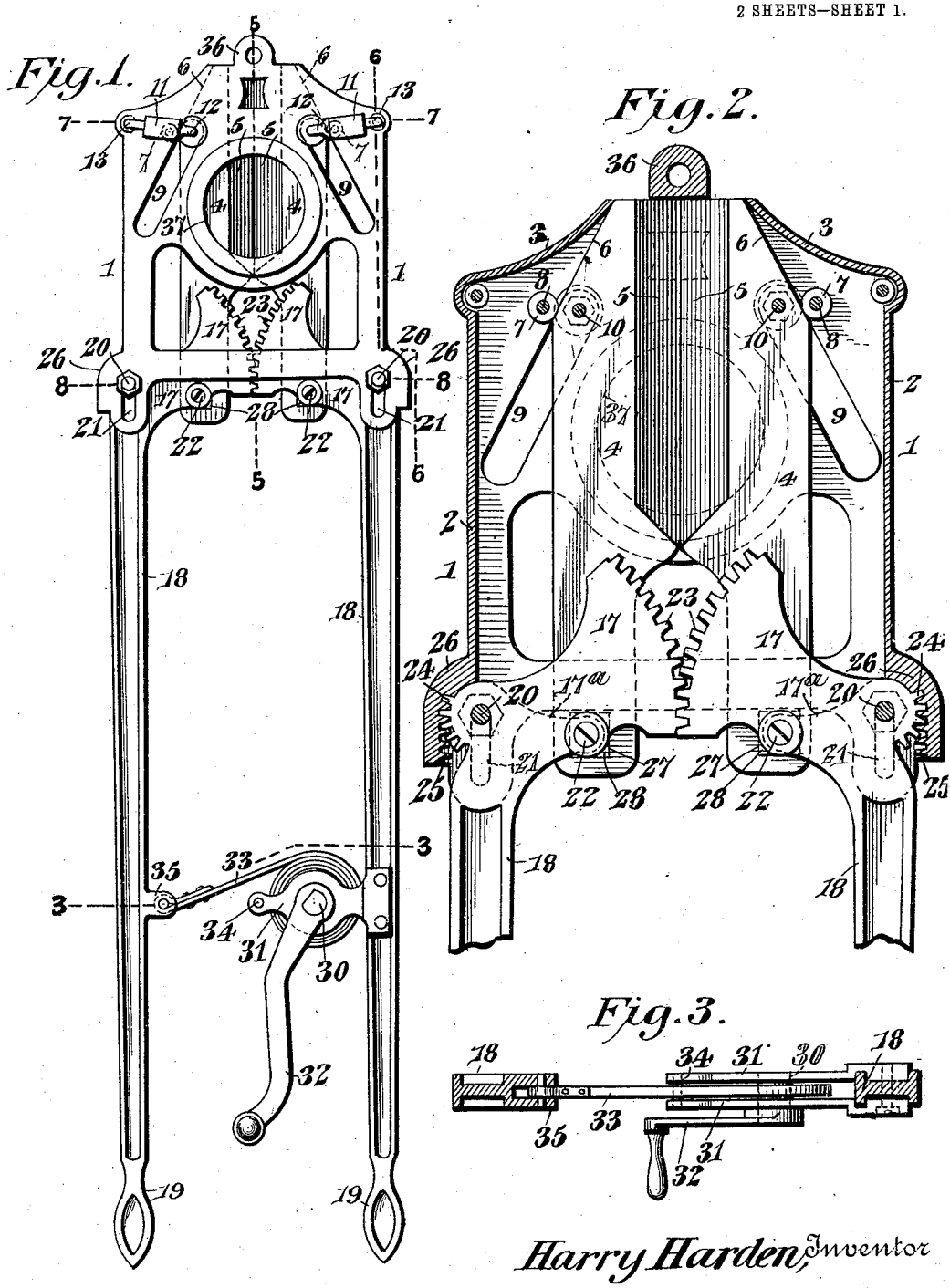

UNITED STATES PATENT OFFICE.

HARRY HARDEN, OF LONDON, OHIO, ASSIGNOR OF ONE-FOURTH TO EDWARD C. HELMAN, OF WAVERLY, OHIO.

CUTTING IMPLEMENT.

No. 844,518. Specification of Letters Patent. Patented Feb. 19, 1907.

Application filed February 24, 1906. Serial No. 302,786.

*To all whom it may concern:*

Be it known that I, HARRY HARDEN, a citizen of the United States, residing at London, in the county of Madison and State of Ohio, have invented a new and useful Cutting Implement, of which the following is a specification.

The invention relates to improvements in cutting implements.

The object of the present invention is to improve the construction of cutting implements and to provide a simple, inexpensive, and efficient cutting implement adapted to be employed for a variety of purposes and capable of enabling great force to be exerted when desired.

A further object of the invention is to provide a cutting implement designed particularly for dehorning cattle and capable of severing a horn from the head of an animal with a shear cut and of removing a horn close to the roots.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a plan view of a cutting implement constructed in accordance with this invention. Fig. 2 is an enlarged longitudinal sectional view of the outer portion of the cutting implement, illustrating the arrangement of the gearing for opening and closing the blades and for also moving the same longitudinally to produce a shear cut. Fig. 3 is a sectional view taken substantially on the line 3 3 of Fig. 1. Fig. 4 is an edge view of the outer portion of the cutting implement. Fig. 5 is a longitudinal sectional view taken substantially on the line 5 5 of Fig. 1. Fig. 6 is a longitudinal sectional view taken substantially on the line 6 6 of Fig. 1. Fig. 7 is a transverse sectional view taken substantially on the line 7 7 of Fig. 1. Fig. 8 is a transverse sectional view taken substantially on the line 8 8 of Fig. 1. Fig. 9 is a detail view of one of the blades.

Like numerals of reference designate corresponding parts in all the figures of the drawings.

1 designates a frame or casing constructed of suitable metal and composed of two parallel sides or plates placed apart and connected by suitable walls 2 and 3, located at the side edges and outer end of the frame or casing. The frame or casing, which is tapered at its outer end, forms a guide for a pair of cutting-blades 4, provided with inner longitudinal cutting edges 5, extending inwardly from the outer ends of the blades, preferably to a point beyond the center of the same and terminating short of the inner ends of the blades; but the cutting edges may be of any desired length to adapt the implement to the character of work to be performed. The cutting edges are formed by beveling the blades at one face, the other face of each blade being smooth, as clearly illustrated in Fig. 7 of the drawings. This will enable the blades to cut off a horn as closely to the head of an animal as desired. In removing the horn it is preferable to cut into the hide about a quarter of an inch to remove the horn close to the roots, and the form of the blades shown will enable this result to be obtained by using the instrument with the flat faces of the blades against the head of the animal.

The outer ends of the blades are cut at an angle at their outer edges to provide tapering portions, and the angularly-disposed edges 6 are adapted to engage and extend between a pair of guide-rollers 7, located at the outer end of the casing and spaced apart to receive the tapered portions of the blades. The guide-rollers are mounted on suitable pivots 8, but any other suitable antifriction guiding device may be employed, if desired. When the blades are moved longitudinally toward the outer end of the casing or frame 1, they are forced inwardly by the opposite guide-rollers, and when they are moved in the opposite direction they are separated.

The casing is also provided at its outer portion with a pair of outwardly-converging slots 9, forming guides or ways for inner pivots 10 of a pair of outer oscillatory links 11. The links 11, which are extensible, are composed of two sections 12 and 13. The section 12 is tubular and receives the other section 13, a coiled spring being housed within the tubular section and interposed between one end of the same and the inner end 15 of the section 13. The inner end 15 of the section 13 is in the form of a head, and the other end of the said section 13 is bent at an angle to provide an outer pivot 16. The tubular section is provided with an inner end wall having a central aperture to receive the section 13. The pivot 10 at the inner end of the link 11 is formed integral with the tubular section 12 and operates in the slots 9. The terminals of the pivots 10 and 16 are threaded to receive nuts, as shown, and the extensible pivots or links connect the outer portions of the blades with the frame or casing and permit the necessary longitudinal and lateral movements of the blades.

The inner ends of the blades are pivoted to arms 17 of a pair of pivotally-mounted members 18, which are provided with terminal grips or handles 19, as clearly illustrated in Fig. 1 of the drawings. These operating members are in the form of substantially L-shaped levers and are connected with the frame or casing at opposite sides of the inner end thereof by means of bolts 20 or other suitable fastening devices, which pierce the levers and pass through longitudinal slots 21 of the frame or casing. The pivots 20 are located at the inner ends of the arms, which are connected with the said blades at an intermediate point by pivots 22. The proximate ends of the arms 17 are enlarged and provided with curved series of teeth 23, which mesh, whereby the operating levers or members 18 are caused to swing inwardly and outwardly in unison and to provide a uniform movement of the blades. The arms 17 of the operating levers or members are arranged at an obtuse angle to the body portion thereof, and the said levers are provided at the angle at their outer edges with curved series of teeth 24, which mesh with longitudinal racks 25 of the frame or casing. The longitudinal racks 25 consist of teeth extending along the frame or casing at the interior of the side edges thereof, as clearly shown in Fig. 2 of the drawings. The inner end of the frame or casing is provided with extensions or enlargements 26, which are provided with the said racks 25. The curved series of teeth 24 and the racks 25 provide outer gearing which operate simultaneously with the outer gearing formed by the teeth 23, and when the operating levers or members are swung inwardly or outwardly the blades are moved laterally or transversely of the device to open and close them and are also given a limited longitudinal movement to provide a shear cut, such longitudinal movement being effected by the outer gearing. The arms 17 of the operating members or levers provide link connections between the inner ends of the blades and the frame or casing, and they are slotted or bifurcated to form two spaced side portions, between which are arranged the inner ends of the blades. One of the side portions of each arm is extended to form the said inner gearing, and the other side portion of each arm terminates short of the toothed side portion to provide an ear for supporting the blade and the pivot 22.

The inner ends of the blades are provided with rectangular openings 27, in which are arranged removable plates 28, which have eccentrically-arranged pivot-openings 29, located closer to one of the longitudinal edges of the plates than to the other, whereby the pivot-openings of the plates may be arranged different distances from the longitudinal edges thereof by simply reversing the plates 28. These reversible plates 28 are adapted to be changed after the blades have become worn and will enable the cutting edges to be brought closer together. Any other suitable means, however, may be employed for effecting an adjustment of the blades.

In order to enable great power to be exerted on the operating levers or members for cutting a large horn or for any other cutting operation requiring excessive power, a windlass is provided. The windlass consists of a shaft 30, mounted in suitable bearing-openings of a pair of arms 31 and having a crank-handle 32 at one end for rotating it to wind up a metallic strap or other flexible connection, which has one end connected with one of the operating members or levers and its other end secured to the shaft 30 of the other operating member or lever. The arms or plates 31 are suitably secured to the side faces of one of the operating members or levers, and their other ends are connected by a transverse pin or rivet 34. The other member or lever is provided with a pair of ears 35, which support a pin or rivet for securing the outer end of the strap 33 between the ears. The windlass-shaft is adapted to be rotated for winding the flexible connection 33 on it, and it will enable the cutting-blades to be moved inwardly with the necessary force to effect the cutting operation.

The casing is provided at its outer end with a projecting eye 36 to enable the cutting implement to be hung on a nail or other support when not in use.

The frame or casing is provided with opposite circular openings 37, adapted to receive the horn to be severed from the head of an animal; but it will be readily apparent that the openings may be varied in size and shape to adapt the cutting implement to the character of the work to be performed.

Having thus fully described my invention, what I claim as new, and desire to secure by Letters Patent, is—

1. A cutting implement comprising a frame, a pair of reciprocatable blades having inner cutting edges and provided with angularly-disposed guiding edges, means mounted on the frame and arranged to be engaged by the said guiding edges to move the blades inwardly, and means for moving the blades longitudinally.

2. A cutting implement comprising a pair of reciprocatable cutting-blades having tapered outer ends, antifriction devices arranged to be engaged by the tapered ends of the blades for forcing the same inwardly, and means located at the other ends of the blades for moving the blades longitudinally.

3. A cutting implement comprising a casing, a pair of reciprocatable blades slidable in the casing and having angularly-disposed edges, relatively fixed means located within the casing and arranged to be engaged by the said edges, and means for moving the blades longitudinally, whereby the said blades will be forced inwardly by the antifriction devices.

4. A cutting implement comprising a frame having slots arranged at an angle, blades, extensible links pivotally connected with the frame and having pivots operating in the slots and connected with the blades, and means for moving the blades longitudinally.

5. A cutting implement comprising a frame having converging slots, a pair of cutting-blades, extensible links operating in the slots and connected with the frame and with the blades, and operating members or levers having link connections with the blades.

6. A cutting implement comprising a frame having angularly-disposed slots, blades having cutting edges, a pair of extensible links connected with the blades and with the frame and operating in the said slots, each link being composed of a plurality of sections or members and provided with a spring for engaging the same, and operating means for moving the blades.

7. A cutting implement comprising a frame having angularly-disposed slots, a pair of blades having cutting edges, extensible links connected with frame and having pivots operating in the slots and connected with the blades, each link being composed of slidable connected members or sections, one of the sections or members being tubular to receive the other, and having a spring which engages each of the members, and means for operating the blades.

8. A cutting implement comprising a frame, a pair of cutting-blades, extensible links connecting the cutting-blades with the frame, oscillatory levers or members connected with the frame and with the blades, and means for moving the levers or members longitudinally when the same are oscillated.

9. A cutting implement comprising a frame, a pair of blades, oscillatory levers or members fulcrumed on the frame and provided with toothed arms meshing with each other and connected with the blades for operating the same, and means for automatically shifting the fulcrum-points of the levers or members when the same are oscillated.

10. A cutting implement comprising a frame, a pair of blades, operating levers or members fulcrumed on the frame and provided with toothed arms meshing with each other and connected with the blades for actuating the same, and outer gearing for moving the levers longitudinally when the same are oscillated.

11. A cutting implement comprising a frame having fixed longitudinal racks, a pair of cutting-blades, and operating levers or members having arms connected with the blades, said arms being provided at their proximate ends with intermeshing teeth, and having teeth at their other ends for engaging the racks of the arm, whereby the levers will be moved longitudinally of the frame when they are oscillated to operate the blades.

12. A cutting implement comprising a frame provided with racks and having slots arranged in parallelism with the racks, levers having pivots operating in the slots, said levers being also provided with teeth meshing with the racks of the frame, whereby the levers are moved longitudinally of the frame when they are oscillated, and means for connecting the levers with the blades.

13. A cutting implement comprising a frame, blades, operating means for the blades provided with pivots, and reversible members carried by the blade and receiving the pivots for changing the position of the same.

14. A cutting implement comprising blades having openings, reversible plates arranged within the openings and having eccentrically-arranged pivots opening, said plates being reversible to arrange the pivot-openings at either side of the center, and operating members provided with pivots for engaging the openings of the reversible plates.

15. A cutting implement comprising a frame provided with angularly-disposed guiding means, blades having angularly-disposed guiding edges, relatively fixed devices mounted on the frame and arranged in the path of the blades to receive the guiding edges thereof, operating mechanism for actuating the blades, and means coöperating with the guiding means for connecting the blades with the frame.

16. A cutting implement comprising a frame having outwardly-converging slots, blades, links operating in the slots and connected with the blades and with the frame, and operating levers or members fulcrumed on the frame and having arms connected with the blades for actuating the same.

17. A cutting implement comprising a frame, a pair of blades, link connections between the blades and the frame, and operating levers or members forming link connections between the blades and the frame, said operating levers or members being also provided with intermeshing teeth for causing the blades to move in unison.

18. A cutting implement comprising a frame, a pair of blades, link connections between the blades and the frame, operating levers or members forming link connections between the blades and the frame, the said operating levers or members being also provided with intermeshing teeth for causing the blades to move in unison, and separate gearing carried by the operating levers or members and by the frame for moving the said levers or members longitudinally when the same are oscillated.

19. A cutting implement comprising a frame having outer converging guides and inner longitudinal guides, a pair of blades, means operating in the outer guides for connecting the blades with the frame, and operating mechanism operated on the frame and operating in the inner guides and connected with the blades.

20. A cutting implement comprising a frame having angularly-disposed guides and longitudinal guides, blades, means operating in the angularly-disposed guides for connecting the blades with the frame, operating means also connected with the blades and having means operating in the other guides, and means for moving the said operating means along the longitudinal guides.

21. A cutting implement comprising a frame, blades, extensible links connected with the blades and with the frame, levers fulcrumed on the frame and connected with the blades, and means for moving the levers in a direction longitudinally of the frame when they are oscillated to operate the blades.

22. A cutting implement comprising a pair of blades, operating members or levers connected with the blades for actuating the same, a windlass-shaft carried by one of the levers or members and having operating means, and a flexible connection attached to the other lever or member with the windlass-shaft and adapted to be wound thereon to move the levers or members inwardly.

23. A cutting implement comprising a frame, a pair of blades, operating levers or members fulcrumed on the frame and provided with bifurcated arms receiving the blades and connected with the same, said arms being extended at one side and provided with teeth meshing with each other, and outer gearing for moving the levers or members longitudinally when the same are oscillated.

In testimony that I claim the foregoing as my own I have hereto affixed my signature in the presence of two witnesses.

HARRY HARDEN.

Witnesses:
FRED VAN WAGENER,
HELEN VAN WAGENER.